United States Patent Office 3,784,700
Patented Jan. 8, 1974

3,784,700
AMINO BENZYL ALCOHOL DERIVATIVES FOR TREATING HYPERTENSION AND INHIBITING GASTRIC SECRETION
Walfred S. Saari, Lansdale, and Charles S. Miller, deceased, by Ruth A. Miller, executrix, Norristown, Pa., assignors to Merck & Co., Inc., Rahway, N.J.
No Drawing. Original application July 10, 1969, Ser. No. 845,120, now Patent No. 3,714,229. Divided and this application Nov. 9, 1970, Ser. No. 88,140
Int. Cl. A61k 27/00
U.S. Cl. 424—311
6 Claims

ABSTRACT OF THE DISCLOSURE

Novel derivatives of 3-hydroxy-α-(1-aminoethyl)-benzyl alcohol, particularly ester derivatives of erythro or threo 3-hydroxy-α-(1 - aminoethyl) - benzyl alcohol and the corresponding 3-ether and 3-ester derivatives thereof, are described. Processes for preparing such novel compounds are also described. The novel compounds are useful as antihypertensive agents and inhibitors of gastric secretion.

This application is a division of U.S. Ser. No. 845,120, filed July 10, 1969, now U.S. Pat. 3,714,229.

BACKGROUND OF THE INVENTION

This invention relates to novel derivatives of 3-hydroxy-α-(1-aminoethyl)-benzyl alcohol. More specifically it relates to novel esters of erythro or threo 3-hydroxy-α-(1-aminoethyl)-benzyl alcohol or the corresponding 3-ether or 3-ester derivatives thereof, and processes for their preparation. Still more specifically it relates to such esters of the levorotatory enantiomorph of erythro 3-hydroxy-α-(1-aminoethyl) - benzyl alcohol. Also this invention relates to esters of the optically active threo 3-hydroxy-α-(1-aminoethyl)-benzyl alcohol.

The absolute configuration of optically active compounds can be described by using the "sequence rule" procedure. In this method, the four groups attached to an asymmetric carbon atom, $C_{abcd}$, are assigned priorities and arranged in sequence so that the sterochemical symbols R or S may be determined. When the asymmetric carbon atom is viewed from the side opposite to the group of lowest priority, $d$, then proceeding from $a$ to $b$ to $c$ traces either a clockwise or a counterclockwise course. If the course is clockwise, then the symbol R is used to describe the stereochemistry at this asymmetric carbon atom. If it is counter-clockwise, the symbol S is used. When the molecule contains more than one asymmetric cener, the procedure is applied to each and the stereochemistry is expressed as a multiplicity of R or S symbols. For purposes of stereoisomer identification in the present series of compounds, the hydroxyl-bearing carbon of the side chain is designated "1" and the nitrogen-bearing carbon is designated "2."

Metaraminol, or (—) erythro 3-hydroxy-α-(1-aminoethyl)-benzyl alcohol (1R,2S configuration), has recently been reported to be an antihypertensive agent in man (J. R. Crout, R. R. Johnston, W. R. Webb, and P. A. Shore, Clin. Res., 13, 204 (1965) and J. R. Crout, Circulation Res., 18, 19 suppl. 1, 1–120 (1966)). This antihypertensive action is believed to result from the release and replacement of norepinephrine in adrenergic nerves by metaraminol. We have found that the hereinafter described ester derivatives of 3-hydroxy-α-(1-aminoethyl) benzyl alcohol can also release norepinephrine from mouse heart tissue. We have also found that these derivatives are cleaved, in vivo, to yield metaraminol. In addition, the novel ester derivatives of (—) erythro 3-hydroxy-α-(1-aminoethyl)-benzyl alcohol (1R,2S), including the 3-ether derivatives thereof such as the benzyl ethers and the halogen substituted benzyl ethers are especially superior to metaraminol in that they do not cause the initial increases in blood pressure and heart rate which are sometimes found with metaraminol. Also, the novel ester derivatives of 3-hydroxy-α-(1-aminoethyl)-benzyl alcohol can be used as inhibitors of gastric secretion.

SUMMARY OF THE INVENTION

It is an object of this invention to provide novel esters of the side-chain hydroxyl of the erythro and threo forms of 3-hydroxy-α-(1-aminoethyl)-benzyl alcohol, 3-ethers or 3-esters thereof and also processes for their preparation. It is a further object of this invention to provide the optically active isomers of such esters.

The compounds of this invention may be associated with a carrier which may be either a solid material or a sterile parenteral liquid. The composition may take the form of tablets, powders, capsules or other dosage forms particularly useful for oral ingestion. Liquid diluents are employed in sterile condition for parenteral use. In general the compounds of this invention are given to patients in doses of 5 to 500 mg. per day. Preferably they are used orally in the range of 5 to 500 mg. per day in divided doses.

The compounds of this invention can be exemplified by (1) compounds of the following formula:

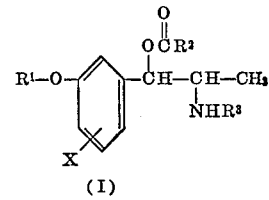

(I)

wherein $R^1$ is hydrogen,

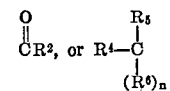

wherein $R^4$ is hydrogen, alkyl, substituted alkyl, cycloalkyl, alkenyl, cycloalkenyl, alkoxy, phenyl, substituted phenyl, benzyl, substituted benzyl or a heterocyclic radical; $R^5$ is hydrogen, alkyl, phenyl or substituted phenyl; $R^6$ is hydrogen, alkyl, or phenyl; X is hydrogen, halogen, hydroxy, alkoxy, alkyl, phenyl or $$\overset{O}{\underset{}{\overset{\|}{O}}}CR^2$$

and wherein $R^4$ and $R^5$ can be combined to form a saturated or unsaturated alicyclic or heterocyclic ring; $n$ is 0 or 1; $R^3$ is hydrogen or lower alkyl; each $R^2$ is hydrogen, alkyl, substituted alkyl, phenyl substituted phenyl, benzyl, substituted benzyl, a heterocyclic radical, cycloalkyl, alkenyl or cycloalkenyl; and (2) non-toxic addition salts of the compounds of group (1).

In accordance with the above formula, the compounds of this invention are esters of a 3-hydroxy-α-(1-aminoethyl)-benzyl alcohol, the acyl group of the ester being bonded to the hydroxy group of the alkyl side chain of the parent compound. The invention further contemplates the 3-ester and 3-ether derivatives of such esters, as well as ring-substitutes analogs of the 3-hydroxy, 3-ether and 3-ester compounds. These compounds may have the erythro or threo configuration, and may be the racemic mixture or substantially pure enantiomorphs.

In the above formula each of $R^2$, $R^4$, $R^5$, $R^6$ and X may be alkyl. When alkyl groups are present in the compound, they will preferably be lower alkyl, that is alkyls of less than about seven carbon atoms. Examples of such groups are the methyl, ethyl, n-propyl, isopropyl, n-butyl, sec-butyl, isobutyl, t-butyl, amyl and hexyl groups. Where any of the above groups may be substituted alkyl, the substituents present can include halogens, typified by chloro, bromo or fluoro; aryl groups, typified by phenyl, tolyl, chlorophenyl, anisyl, or dimethylaminophenyl; hydroxy; amino; carboxy or carboxylic acid esters; and lower alkoxy such as methoxy, ethoxy or propoxy.

Each of $R^2$ and $R^4$ can be cycloalkyl of up to seven carbon atoms in the ring, including cyclopentyl and cyclohexyl; or cycloalkenyl of up to seven carbon atoms in the ring, including cyclopentenyl, cyclohexenyl or cyclohexadienyl.

Each of $R^2$, $R^4$, $R^5$, $R^6$ and X can be phenyl. When any of the above groups is substituted phenyl, the substituents can be halogen, preferably chloro or fluoro; lower alkyl; perfluoro lower alkyl such as trifluoromethyl, lower alkoxy such as methoxy, ethoxy, propoxy or isopropoxy, hydroxy, amino, alkylamino, dialkylamino, alkylthio, alkylsulfinyl, alkylsulfonyl, nitro, sulfamoyl, alkylsulfonamido or phenyl. In the case wherein $R^2$ or $R^4$ is a heterocyclic radical, the heterocyclic radical can be any 3 to 7 membered saturated or unsaturated ring containing one or more hetero atoms such as sulfur, oxygen or nitrogen atoms. Also, the heterocyclic radicals can be those carrying substituents such as lower alkyl, halogen (chloro, bromo, iodo or fluoro) or methoxy. Representative heterocycles from which the radicals $R^2$ and $R^4$ can be derived are: pyridine, furan, pyran, thiophene, 4-methylpyridine, pyrazine, pyridine-N-oxide, pyrimidine, thiazole, imidazole and benzimidazole.

Each of $R^4$ and X may be alkoxy, suitably a lower alkoxy group, where the lower alkyl portion of the group is as defined above. Each of $R^2$ and $R^4$ can be benzyl or substituted benzyl, the possible substituents being the same as those noted above for the phenyl group. Each of $R^2$ and $R^4$ may be alkenyl, suitably lower alkenyl, illustrated by allyl, vinyl and 1-(4-pentenyl). $R^3$ is hydrogen or lower alkyl, e.g., methyl or ethyl.

In the compounds of Formula I wherein $R^4$ and $R^5$ can be connected together to form a saturated or unsaturated alicyclic or heterocyclic radical, the ring formed is preferably a 3–7-membered ring such as cyclopentyl, cyclohexyl, cyclohexenyl, phenylcyclohexyl, piperazinyl, pyridyl or pyridyl-N-oxide. The saturated or unsaturated alicyclic or heterocyclic radicals can also be substituted with phenyl substituents.

In the above Formula I, $n$ will be 0 when the ether carbon atom C is joined to either $R^4$ or $R^5$ through an unsaturated bond. In all other cases $n$ will be 1.

The preferred compounds are those of erythro configuration, and especially the isomers having the 1R,2S side chain configuration. The compounds found most useful for reducing blood pressure are those wherein $R^2$ is hydrogen, phenyl, substituted phenyl, or lower alkyl; $R^3$, $R^5$, $R^6$ and X are hydrogen; and $R^4$ is hydrogen, lower alkyl, phenyl or substituted phenyl, especially p-chlorophenyl, m-chlorophenyl or m-fluorophenyl and those wherein $R^2$ is hydrogen, phenyl, substituted phenyl or lower alkyl and $R^1$, $R^3$ and X are hydrogen. Where the compound contains a plurality of $R^2$ groups, they need not all be the same.

Representative of the novel compounds of this invention are the formate, acetate, propionate, butyrate, benzoate, trichloroacetate, cyclohexanoate, acrylate, methacrylate, p-chlorobenzoate, p-methoxybenzoate, p-dimethylaminobenzoate, picolinate and phenylacetate esters of the racemic and optically active forms having the 1R,2S configuration of Erythro 3-(hydroxy, formyloxy, acetoxy, propionyloxy, butyryloxy, trichloroacetoxy, benzoyloxy)-α-(1-aminoethyl)-benzyl alcohol;

Erthro 3-(hydroxy, formylovy, acetoxy, propionyloxy, butyryloxy, trichloroacetoxy, benzoyloxy)-5-(chloro, fluoro, methyl, methoxy)-α-(1-aminoethyl)-benzyl alcohol;

Erythro 3-(hydroxy, formyloxy, acetoxy, propionyloxy, butyryloxy, benzoyloxy)-6-(fluoro, chloro, methyl, methoxy, dimethylamino)-α-(1-aminoethyl)-benzyl alcohol;

Erythro 3-(benzyloxy, α-methylbenzyloxy, p-chlorobenzyloxy, o-fluorobenzyloxy, m-bromobenzyloxy, m-chlorobenzyloxy, p-fluorobenzyloxy, m-fluorobenzyloxy, p-iodobenzyloxy, m-methoxybenzyloxy, α-ethylbenzyloxy, m-isopropylbenzyloxy)-α-(1-aminoethyl)-benzyl alcohol;

Erythro 3-[allyloxy, (1-pentenyl-5-oxy), (1-butenyl-4-oxy), 1-cyclohexenyl-3-oxy)]-α-(1-aminoethyl)-benzyl alcohol;

Erythro 3-(methoxymethyloxy, ethoxymethyloxy, isopropoxymethyloxy)-α-(1-aminoethyl)-benzyl alcohol;

Erythro 3-[(2-phenyl-1-ethyloxy), diphenylmethyloxy]-α-(1-aminoethyl)-benzyl alcohol;

Erythro 3-(cyclohexylmethyloxy, cyclopentylmethyloxy, cyclobutylmethyloxy)-α-(1-aminoethyl)-benzyl alcohol;

Erythro 3-(2-picolyloxy, 2-thienylmethyloxy, furfuryloxy, 4-picolyloxy, 2-pyranylmethyloxy, 2-piperidylmethyloxy)-α-(1-aminoethyl)-benzyl alcohol;

Erythro 5-(fluoro, chloro or methyl)-3-methoxy-α-(1-aminoethyl)-benzyl alcohol;

Erythro 6-(fluoro, chloro, bromo, ethyl, methyl)-3-methoxy-α-(1-aminoethyl)-benzyl alcohol;

Erythro 3-hydroxy-α-[1-methyl (or ethyl) aminoethyl]-benzyl alcohol;

Erythro 4-(fluoro, chloro or methyl)-3-hydroxy-α-(1-aminoethyl)-benzyl alcohol;

Erythro 3-(4-pyridyloxy, 2-pyridyloxy, 2-pyrazinyloxy)-α-(1-aminoethyl)-benzyl alcohol;

Erythro 3-[(1-phenylcyclohexyloxy), (2-phenylcyclohexyloxy), (2-phenylcyclophentyloxy)] - α - (1-aminoethyl)-benzyl alcohol;

Erythro 3-benzyloxy-5-(chloro, fluoro or methyl)-α-(1-aminoethyl)-benzyl alcohol.

In addition to the above preferred compounds, the racemic threo compounds are also intended to be included in this invention as well as the optically active forms of the erythro and threo configuration.

The compounds of this invention are readily prepared by a number of methods, the most convenient of which involve the reaction of an N-blocked α-(1-aminoethyl)-benzyl alcohol with a reactive derivative of an acid $R_2COOH$, such as the acid halide or anhydride, followed by removal of the N-blocking group. Alternatively, the compounds can be prepared by rearrangement of a suitable N-acyl derivative. The precise benzyl alcohol derivative selected as the reactant will be determined by the desired end product.

The novel compounds can be prepared by rearrangement of an N-acylated-α-(1-aminoethyl)-benzyl alcohol or an N-acylated - 3 - (2-amino-1-chloropropyl)-phenol under acidic conditions according to the reaction:

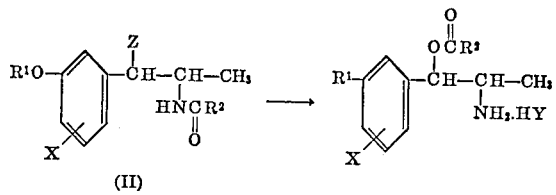

wherein HY is the acid employed and Z is hydroxyl (OH) or halogen, preferably chlorine. Where Z is hydroxyl, the reaction can be represented as:

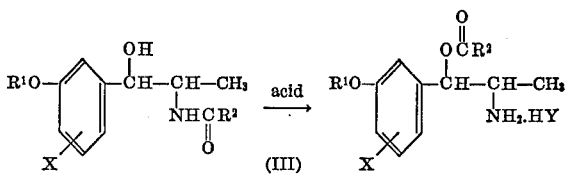
(III)

This reaction is particularly employed with reactants where $R^1$ is hydrogen or

the $R^1$ group being retained throughout the reaction. This reaction usually proceeds with retention of configuration at the hydroxyl and amino bearing carbon atoms of the side chain. Thus the erythro reactant gives erythro product and the threo reactant gives threo product. However in those cases where a mixture of erythro and threo products are obtained in the reaction, the erythro isomer may be isolated conveniently by treatment of the mixture with base followed by acidification. Rearrangement of the threo ester to the acid insoluble threo amide is much faster than the rearrangement of the erythro ester to the erythro amide.

The above reaction is preferably carried out in an inert diluent such as a lower alkanol. Reaction temperature of the order of from about 30° C. to the boiling point of the solvent are suitable, with temperatures in the upper part of the range being preferred. Atmospheric pressure is generally satisfactory, although higher and lower pressures can also be used.

The acid employed should be a strong acid, preferably a mineral acid such as hydrochloric, sulfuric or phosphoric acid. The group $R^2$ may be any of those hereinbefore described, particularly alkyl, phenyl or substituted phenyl. The products are isolated and purified by conventional techniques, including solvent extraction, recrystallization etc. The products wherein $R^1$ is hydrogen can, if desired, be esterized with a reactive derivative of an acid, the acid moiety being either the same or different from that attached to the alpha-carbon of the side chain, to produce compounds of the invention where $R^1$ is $$-\overset{O}{\overset{\|}{C}}R^2$$

In any such subsequent esterification, the amino nitrogen should be protected by salt formation or by a suitable blocking group.

Where Z in the equation given above is halogen, preferably chlorine, the N - acyl 3-(2-amino-1-chloropropyl)-phenol is transformed in the presence of water and acid, according to the equation:

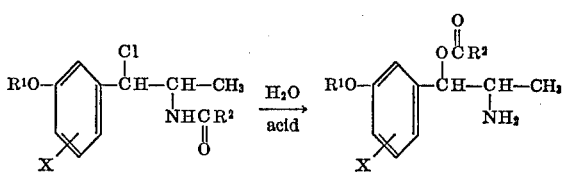

This reaction is most suitable for the compounds wherein $R^1$ is hydrogen or

The acid employed can be any strong acid, preferably a mineral acid such as sulfuric, hydrochloric or phosphoric acids or acidic salts thereof. The product will usually be obtained as the acid addition salt of the amine.

The reaction is preferably carried out in an inert liquid diluent, such as a lower alkanol, containing a small quantity of water. Elevated temperatures in the range of about 30° C. to the boiling point of the solvent are typically used, with the higher temperatures being preferred. Atmospheric pressure is suitable, although higher or lower pressures may be used.

The reaction proceeds with inversion of the configuration of the alpha-carbon of the side-chain, and thus the threo reactant gives erythro product, and vice versa.

Another method for preparing compounds of the invention is by reaction of an N-blocked α-(1-aminoethyl)-benzyl alcohol compound with an acid halide or anhydride of the acid $R^2COOH$ according to the equation:

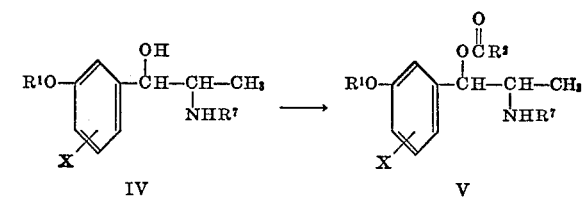
IV        V followed by removal of the N-blocking group $R^7$ to regenerate the free amino group.

The N-blocking group $R^7$ may be any group which is stable during the acylation reaction but which can be subsequently cleaved, preferably by catalytic hydrogenation or by selective hydrolysis. Illustrative of such groups are the benzoyloxycarbonyl group and inertly ring-substituted derivatives thereof, the t-butoxycarbonyl group, the triphenylmethyl (trityl) group, the benzyloxymethyl group, the pivaloyloxymethyl group and the like.

The acid derivative employed as a reactant can be an acid halide, preferably an acid chloride or bromide, or an anhydride of the acid $R^2COOH$. The reaction is preferably carried out in a liquid diluent and in the presence of a base to take up the equimolar quantities of acid produced. Suitable bases are tertiary amines such as triethyl amine and pyridine and these amines may serve also as the medium for the reaction. The reaction is preferably carried out at elevated temperatures ranging from about 30° C. to the boiling point of the solvent, with the higher temperatures being preferred. Atmospheric pressure is suitable for the reaction, but higher or lower pressures may also be used.

If desired, where $R^1$ is hydrogen an excess of the acid halide or anhydride can be employed in order to esterify both the side-chain and phenolic hydroxy groups. If the desired product compound is one wherein $R^1$ is hydrogen, it is most efficient to provide an O-blocking substituent on the phenolic hydroxyl group during the acylation reaction, to avoid side reactions and loss of starting material. Any group which is stable throughout the reaction but is subsequently removable, preferably by catalytic hydrogenation or selective hydrolysis, can be used. Illustrative suitable O-blocking groups are benzyl, inertly ring-substituted benzyl, methoxymethyl, triphenylmethyl and the like. Removal of the N-blocking group and O-blocking group, if any, is accomplished by a technique suitable for the particular groups involved. The preferred method is by catalytic hydrogenation using a noble metal catalyst such as palladium, or platinum oxide. Selective acid or base hydrolysis may also be used where applicable.

In the above reaction, the configuration of the starting material is substantially retained, so that erythro reactant yields erythro product and threo reactant yields threo product. Work-up and purification of the product is by conventional means, including solvent extraction and recrystallization.

The reactants employed in the above-described processes are readily prepared from available starting materials. For example, the Compounds VI can be prepared by the following sequence:

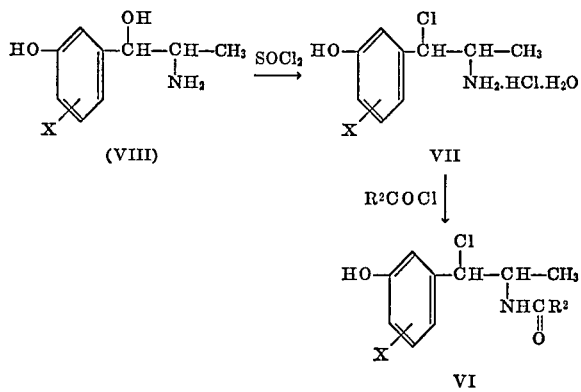

Compound VIII is the available 3-hydroxy-α-(1-aminoethyl)-benzyl alcohol or a ring-substituted derivative thereof, in either the erythro or threo configuration, and either as the racemic mixture or as a substantially pure optical isomer. Compound VIII is treated with thionyl chloride or an equivalent halogen source in an inert liquid diluent such as chloroform at temperatures of about 0° C. to 75° C. to give Compound VII. Compound VII is acylated by reaction with an acid halide or anhydride in the presence of base to give Compound VI.

Where the desired product is one wherein $R^1$ is

the starting material will be the desired 3-ether derivative IX, which can be prepared by the following sequence:

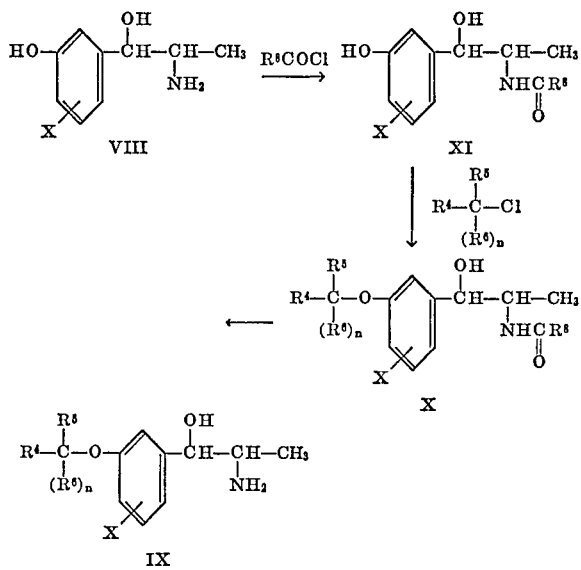

wherein $R^8$ is, for example, lower alkyl. In accordance with this sequence, Compound VIII is acylated by reaction with a lower alkanoyl halide or anhydride to give Compound XI. Compound XI is converted to the phenolic ethers by reaction with the appropriate organic halide or the equivalent tosylate, mesylate, brosylate or quaternary ammonium compound to give Compound X which is deacylated by acid or base hydrolysis to give Compound IX. Further disclosure of methods for preparing Compound IX is given in U.S. patent application Ser. No. 636,586, filed May 8, 1967.

Compound IV which is useful in the preparation of compounds of the invention is similarly prepared by condensing Compound VIII or the appropriate 3-ether derivatives thereof IX and a reactive compound containing the H-blocking group, $R^7$. Typically, this reactive compound will be of the form $R^7$-Hal wherein Hal is reactive halogen, preferably chlorine or bromine. Illustrative compounds $R^7$-Hal include trityl chloride, benzyloxycarbonyl chloride, benzyloxycarbonyl bromide, t-butoxycarbonyl chloride, t - butoxycarbonyl bromide, benzyloxymethyl chloride, benzyloxymethyl bromide, chloromethyl pivalate, etc. The reaction is carried out under normal conditions for reactions of amines with organic halides, including the use of liquid diluent and a base to take up the mole of halogen acid formed. The preferred bases are tertiary amines such as triethyl amine and pyridine, which may also function as the diluent.

In a similar manner, Compound III is readily prepared according to the reaction:

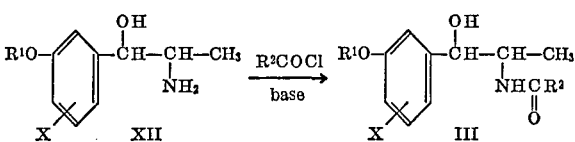

The acid chloride can be replaced by other equivalent acid halides or anhydrides. The reaction conditions are generally similar to those described above for the preparation of compound IV.

In order to prepare compounds of Formula I wherein X is other than hydrogen, e.g. lower alkyl or halo, one may start in any of the above-described processes with the appropriately substituted aminoalcohol, such as the lower alkyl or halo nuclear substituted aminoalcohol. Generally, these derivatives are prepared by nitrosating the appropriate nuclear substituted propiophenone derivative to the hydroximino ketone followed by catalytic reduction of the hydroximino ketone to the amino alcohol. Detailed methods for preparing representative substituted propiophenone derivatives and the corresponding substituted amino alcohols are shown in the examples as well as in the copending U.S. application Ser. No. 636,586.

In order to prepare the desired configuration of the desired ester derivatives (Compound I) it is desirable to start with a substantially pure starting material with either the erythro or threo configuration either as the racemic mixture or as a single enantiomorph. Therefore, it may be necessary to resolve the racemic starting material or an intermediate product, or the end products. Any general method for resolving amines, particularly the method of forming an optically active salt using optically active acids such as optically active tartaric acid, dibenzoyl tartaric acid, camphor sulfonic acid, or mandelic acid, and separating the diastereoisomers followed by liberation of the optically active base can be used. Other resolution methods such as spontaneous resolution or resolution by enzymatic means are equally applicable and can also be used to isolate the erythro or threo enantiomorphs from the racemic mixtures.

In certain cases, it is desirable to prepare derivatives of Compound I. For example, the amine salts such as the mesylate, sulfate, hydrochloride, hydrogen maleate, fumarate and hydrogen tartrate salts are useful both therapeutically and in purifying the compounds by recrystallization. These amine salts are readily prepared by treating the free amine with the desired acid in a suitable solvent such as a lower alkanol and thereafter precipitating the salt by adding a non-solvent such as ethyl ether. If desired, the salts can be cleaved by treatment with a base to regenerate the free amine.

In order to prepare the N-methyl or N-ethyl derivative of the particular Compound I, one starts with the appropriate N-alkyl derivative XIII. Compound XIII can be prepared by reduction of the N-acyl derivative III with lithium aluminum hydride in a solvent such as ethyl ether or tetrahydrofuran as shown.

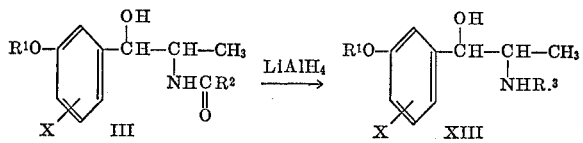

The reduction is run at anywhere from room temperature to the reflux temperature of the particular solvent used for a time sufficient to complete the reaction. The desired product can then be isolated from the reaction mixture by methods known in the art.

The following examples illustrate this invention, and are to be construed as illustrations of the invention rather than limitations thereof.

EXAMPLE 1

Preparation of (−) erythro α-(1-aminoethyl)-3-hydroxybenzyl acetate (1R,2S)

Step (a): Preparation of (−) erythro α-(1-acetamidoethyl)-3-hydroxybenzyl alcohol (1R,2S).—To a stirred solution of 75 g. (0.237 mole) of (−) erythro α-(1-aminoethyl)-3-hydroxybenzyl alcohol - (+)- hydrogen tartrate (metaraminol bitartrate) in 750 ml. of water is added 195 g. of sodium bicarbonate. The solution is cooled to 5–10° C., 120 ml. of acetic anhydride is added dropwise over 30 minutes, and the reaction mixture is allowed to warm to room temperature over a 2-hour period. After stirring at room temperature for 15–20 hours, solid sodium bicarbonate is added to neutralize any remaining acid. The crude product is isolated by extraction with three 400 ml. portions of ethyl acetate which are then combined and dried over anhydrous sodium sulfate, filtered and concentrated to a syrup. This product is added to 200 ml. of a 10% sodium hydroxide solution and is stirred at room temperature for 24 hours. After cooling in an ice bath, concentrated hydrochloric acid is added to adjust the pH of the solution to 1–2. The precipitated light tan solid is isolated by filtration and dried at 65° C. to give 49 g. of (−) erythro α-(1-acetamidoethyl)-3-hydroxybenzyl alcohol (1R,2S) hydrate, M.P. 95–102° C., $[\alpha]_D^{25} = -18.5°$ (c.=5, $CH_3OH$).

A sample recrystallized three times from an ethyl acetate-hexane mixture gives a hydroscopic analytical sample having a melting point of 122.5–123.5° C.

Analysis.—Calcd. for $C_{11}H_{15}NO_3$ (percent): C, 63.15; H, 7.23. Found (percent): C, 62.73; H, 7.26.

Step (b): Preparation of (−) erythro α-(1-aminoethyl)-3-hydroxybenzyl acetate (1R,2S).—A solution of 5.3 g. (0.025 mole) of (−) erythro α-(1-acetamidoethyl)-3-hydroxybenzyl alcohol in 3.8 ml. of concentrated hydrochloric acid and 150 ml. of ethanol is heated for one hour at reflux. After concentrating under reduced pressure, the residue is dissolved in methanol and filtered through a charcoal pad. The product, (−) erythro α-(1-aminoethyl)-3-hydroxybenzyl acetate hydrochloride, M.P., 102° (decomposition) with sintering at 90°, is precipitated with a mixture of benzene and ether.

Analysis.—Calcd. for $C_{11}H_{16}ClNO_3 \cdot \frac{1}{2}CH_3OH$ (percent): C, 52.77; H, 6.93; N, 5.35; Cl, 13.55. Found (percent): C, 52.69; H, 6.98; N, 5.32; Cl, 13.61.

$[\alpha]_D^{25} = -34.5°$ (c.=2, $CH_3OH$).

EXAMPLE 2

Preparation of (+) erythro α-(1-aminoethyl)-3-hydroxybenzyl benzoate (1R,2S)

Step (a): Preparation of (+) erythro α-(1-benzamidoethyl)-m-hydroxybenzyl alcohol.—To a solution of 37.5 g. (0.118 mole) of (−) erythro α-(1-aminoethyl)-3-hydroxybenzyl alcohol-(+)-hydrogen tartrate in 375 ml. of water cooled to 5° C. there is added 97.5 g. of sodium bicarbonate followed by 56.4 g. (0.25 mole) of benzoic anhydride. The reaction mixture is stirred for 20 hours at 20–30° C. and then extracted with two 200 ml. portions of ethyl acetate. The organic extract is concentrated and the residue is dissolved in a mixture of 200 ml. of methanol and 100 ml. of 10% aqueous sodium hydroxide solution and is stirred at 20–30° C., for 20 hours. The solution is acidified with 6 N hydrochloric acid and the product is extracted into two 200 ml. portions of ethyl acetate which are then washed sequentially with saturated aqueous sodium bicarbonate solution and water. The organic layer is dried over anhydrous sodium sulfate and filtered, the solvent is removed under reduced pressure. The residue is recrystallized from an ethanol-benzene mixture to give 20.7 g. (64.7%) of the benzamide, M.P. 123–126° C. An analytical sample, M.P. 126.6–128.6° C., is obtained by recrystallization from ethyl acetate-hexane, $[\alpha]_D^{25} = +42.8°$ (c.=2, $CH_3OH$).

Analysis.—Calcd. for $C_{16}H_{17}NO_3$ (percent): C, 70.83; H, 6.32. Found (percent): C, 71.09; H, 6.51.

Step (b): Preparation of (+) erythro α-(1-aminoethyl)-3-hydroxybenzyl benzoate (1R,2S).—A mixture of 2.7 g. (9.96 mmoles) of the (+) erythro α-(1-benzamidoethyl)-3-hydroxybenzyl alcohol of step (a) and 1.2 ml. of 8 N ethanolic-hydrochloric acid in 50 ml. of ethanol is heated for 4 hours at reflux. The ethanol is removed under reduced pressure and the residue is shaken with excess saturated sodium carbonate solution and 50 ml. of ethyl acetate. The aqueous layer is reextracted with 50 ml. of fresh ethyl acetate. The ethyl acetate extracts are combined, dried over anhydrous sodium sulfate, filtered and allowed to stand at 20–30° C. for 20 hours. A small amount of insoluble solid is removed by filtration and excess ethanolic-hydrogen chloride solution is added to the filtrate. Cooling gives 0.50 g. (16.2%) of the erythro benzoyl ester in the form of the hydrochloride salt uncontaminated with the threo isomer. Recrystallization from ethanol-ethyl ether gives pure product, M.P. 253° C. softens, 256° C. dec.

EXAMPLE 3

Preparation of (+) erythro α-(1-aminoethyl)-3-hydroxybenzyl benzoate (1R,2S)

Step (a): Preparation of erythro α-(1-aminoethyl)-3-benzyloxy - N - carbobenzyloxybenzyl alcohol.—A 10% aqueous sodium hydroxide solution is added dropwise to a cold, stirred mixture of 30.0 g. (0.0805 mole) of the hydrogen maleate salt of (−) erythro α-(1-aminoethyl)-m-benzyloxybenzyl alcohol, 300 ml. of water and 300 ml. of acetone until the pH of the solution remains at 8.5. A total of 15.3 g. (0.090 mole) of carbobenzyloxy chloride is then added dropwise over 40 minutes to the slightly basic solution of the amino alcohol cooled by an ice bath. Sodium hydroxide solution is added simultaneously with the carbobenzyloxychloride to maintain a pH of 8.0–8.5. After addition is complete and the reaction mixture has been stirred at ice-bath temperature for another 2.5 hours, 6 N hydrochloric acid is added slowly to adjust the pH to 2.0. The product is removed by filtration and recrystallized from an ethyl acetate-petroleum ether (30–60° C.) mixture to give 15.2 g. of product, M.P. 114–116° C. An additional 1.6 g. of product, M.P. 110–112° C., is obtained from the mother liquors.

Step (b): Preparation of (+) erythro α-(1-aminoethyl)-3-hydroxybenzyl benzoate (1R,2S).—A solution of benzoyl chloride, 1.9 g. (0.0135 mole) in 50 ml. of anhydrous pyridine is added slowly to a stirred solution of 5.0 g. (0.0128 mole) of the product from step (a) in 100 ml. of anhydrous pyridine at 100° C. After the addition is complete, the reaction mixture is stirred at 100° C. for an additional hour and then allowed to cool to 20–30° C. over 18 hours. Pyridine is removed under reduced pressure and the residual oil is dissolved in 200 ml. of ethyl acetate. The solution is washed with 200 ml. of water containing 1 ml. of 6 N hydrochloric acid and the aqueous layer is extracted with fresh ethyl acetate. The combined ethyl acetate extracts are dried over anhydrous magnesium sulfate and concentrated under reduced pressure to give the crude benzoyl ester with the benzyl and carbobenzyloxy protecting groups intact. Both protecting groups are removed by hydrogenation with 0.8 g. of a 10% palladium-on-carbon catalyst in 200 ml. of ethanol containing 12 ml. of 6 N hydrochloric acid at 20–30° C. and atmospheric pressure. After absorption of hydrogen is completed, the catalyst is removed by filtration and the filtrate concentrated under reduced pressure to give a solid. Recrystallization from an ethanol-ethyl ether mixture gives 1.8 g. (45.7%) of product in the form of the hydrochloride salt, M.P. 253° C. soften, 256° C. dec., $[\alpha]_D^{25} = +81.7°$ (c.=3, $CH_3OH$).

*Analysis.*—Calcd. for $C_{16}H_{18}ClNO_3$ (percent): C, 62.43; H, 5.89; N, 4.55. Found (percent): C, 62.31; H, 6.13; N, 4.51.

By using (+) or (−) threo α-(1-aminoethyl)-3-benzyloxybenzyl alcohol in place of the erythro amino alcohol in step (a) and carrying out the operation described in steps (a) and (b) of Example 3, the optically active isomers of threo α-(1-aminoethyl)-m-benzyloxybenzyl benzoate are obtained.

Diesters are obtained by using (−) erythro α-(1-aminoethyl)-3-hydroxybenzyl alcohol in step (a) to give the corresponding N-carbobenzyloxy derivative and an excess (at least two molar equivalents) of the acid chloride in step (b). In this way, erythro α-(1-aminoethyl)-3-benzyloxybenzyl benzoate is obtained from erythio α-(1-[N-carbobenzyloxy]-aminoethyl) - 3 - hydroxybenzyl alcohol and an excess of benzoyl chloride by the procedure of step (b). Erythro 3-acetoxy-α-(1-aminoethyl)-benzyl acetate is obtained by the same procedure using an excess of acetyl chloride in step (b).

EXAMPLE 4

Preparation of (+) erythro α-(1-aminoethyl)-3-hydroxybenzyl 2'-methylbenzoate (1R,2S)

Step (a): Preparation of (+) threo 3-(2-amino-1-chloropropyl)-phenol hydrochloride hydrate.—A quantity of 147.0 g. (0.71 mole) of thionyl chloride is added slowly to a stirred solution of 31.8 g. (0.189 mole) of (−) erythro α-(1-aminoethyl)-3-hydroxybenzyl alcohol in 120 ml. of chloroform at 25° C. under a nitrogen atmosphere. During the course of the addition, the temperature is increased to 50° C., at which point vigorous reaction is observed. Heating and stirring are discontinued until foaming subsides. The mixture is heated with stirring at 55° C. for 20 minutes, then cooled to room temperature. The tan precipitate is collected, washed with 400 ml. of benzene and dried at 75° C. for one hour to yield 36.7 g. (88%) of product, M.P. 118.0–121.0° C.

$$[\alpha]_D^{25} = +71.2°$$

(c.=2, $CH_3OH$).

*Analysis.*—Calcd. for $C_9H_{13}ClNO \cdot H_2O$ (percent): C, 45.01; H, 6.30; N, 5.83. Found (percent): C, 44.85; H, 6.02; N, 5.81. $H_2O$, 0.9 mole.

Step (b): Preparatiton of (+) erythro α-(-aminoethyl)-3-hydroxybenzyl 2' - methylbenzoate (1R,2S).—A solution of 7.94 g. of sodium bicarbonate in 50 ml. of water is added slowly to a rapidly stirred mixture of 3.5 g. (0.0146 mole) of (+) threo 3-(2-amino-1-chloropropyl)-phenol hydrochloride hydrate from step (a) and 4.9 g. (0.0316 mole) of 2-methylbenzoyl chloride in 50 ml. of ethyl acetate at 20–30° C. After the addition is complete, the reaction mixture is stirred at room temperature for 20 minutes. The ethyl acetate layer is removed and the aqueous layer extracted with two 50 ml. portions of fresh ethyl acetate. The ethyl acetate extracts are combined, dried over an anhydrous sodium sulfate, filtered and concentrated at 60° C. under reduced pressure to give 5.8 g. of crude 2-methylbenzamide derivative.

This intermediate without further purification, is dissolved in 60 ml. of 7 N ethanolic-hydrogen chloride containing 10 drops of water and is heated at reflux for 30 hours. The solvent is removed at 75° C. under reduced pressure and the solid residue is recrystallized from methanol-ethyl acetate to give 0.58 g. (12.3%) of the 2-methylbenzoate ester, M.P. 231° C. soften, 234° dec. Further recrystallization from methanol-ethyl acetate gives an analytical sample, M.P. 237–239° dec., $[\alpha]_D^{25} = +45.0°$ (c.=2, $CH_3OH$).

*Analysis.* — Calcd. for $C_{17}H_{20}ClNO$ (percent): C, 63.44; H, 6.26; N, 4.35. Found (percent): C, 63.43; H, 6.60; N, 4.29.

EXAMPLE 5

Preparation of threo α-(1-aminoethyl)-3-hydroxybenzyl acetate

Step (a): Preparation of m - benzyloxy-α-bromopropiophenone.—A solution of 32.5 g. (0.203 mole) of bromine in 50 ml. of methylene chloride is added over ¾ hour to a stirred solution of 50 g. (0.208 mole) of m-benzyloxypropiophenone in 50 ml. of methylene chloride. Nitrogen is bubbled through the reaction during the addition and for an additional three hours after addition is complete. The methylene chloride solution is washed with an aqueous sodium bicarbonate solution and dried over anhydrous sodium sulfate. After filtering the drying agent, methylene chloride is evaporated under reduced pressure and the residue is dissolved in ethyl ether. The ether solution is washed with a 5% sodium hydroxide solution and water and then dried over anhydrous sodium sulfate and filtered. Removal of the ether solvent and recrystallization of the residue from hexane gives 50.5 g. (78%) of the α-bromo ketone, M.P. 46.5–49.0° C.

*Analysis.*—Calcd. for $C_{16}H_{15}BrO_2$ (percent): C, 60.20; H, 4.74; Br, 25.04. Found (percent): C, 59.96; H, 4.58; Br, 25.36.

Step (b): Preparation of m - benzyloxy-α-dibenzylaminopropiophenone hydrochloride.—A solution of 33.5 g. (0.105 mole) of m-benzyloxy-α-bromopropiophenone and 43.4 g. (0.220 mole) of dibenzylamine in 400 ml. of absolute ethyl alcohol is stirred at reflux for 6 hours. The cooled reaction mixture is filtered and the filtrate concentrated under reduced pressure. The residue is extracted with ethyl ether which is then washed with water and dried over anhydrous sodium sulfate. After filtering and concentrating the residue is dissolved in ethyl acetate, treated with an ethanolic-hydrogen chloride solution and cooled. A small amount of dibenzylamine hydrochloride is removed by filtration. Ethyl ether is added to the filtrate to precipitate 17.0 g. (34.4%) of m-benzyloxy-α-dibenzylaminopropiophenone hydrochloride, M.P. 142.9–145.9° C. An analytical sample is obtained by further recrystallization from an ethyl acetate-hexane mixture.

*Analysis.* — Calcd. for $C_{30}H_{30}ClNO_2$ (percent): C, 76.33; H, 6.41; N, 2.97. Found (percent): C, 76.29; H, 6.06; N, 3.21.

Step (c): Preparation of threo 3-benzyloxy-α-(1-dibenzylaminoethyl)-benzyl alcohol.—The m - benzyloxy-α-dibenzylaminopropiophenone hydrochloride, 4.26 g. (9.03 mmoles), is converted to the free base by shaking in a separatory funnel with 25 ml. of water, 5 ml. of a 10% sodium hydroxide solution and 50 ml. of ethyl ether until all of the solid has dissolved. The ethyl ether extract is washed with water and dried over anhydrous magnesium sulfate. The filtered ethyl ether extract is added over ½ hour to a well-stirred mixture of 0.3 g. of lithium aluminum hydride and 20 ml. of dry ethyl ether under nitrogen. After stirring for 4 hours at reflux, the reaction mixture is cooled in an ice bath and excess lithium aluminum hydride is decomposed with a saturated sodium-potassium tartrate solution. The resulting viscous aqueous mixture is extracted several times with ethyl acetate. The combined ethyl acetate extracts are washed with a saturated sodium chloride solution, dried over anhydrous sodium sulfate and filtered. Solvent is evaporated under reduced pressure to give 3.2 g. (81.0%) of the threo alcohol, M.P. 117.6–122.1° C. soften at 115° C. Recrystallization from a benzene-hexane solvent mixture followed by recrystallization from methanol gives 2.4 g. (60.7%) of threo 3-benzyloxy-α-(1 - dibenzylaminoethyl) - benzyl alcohol, M.P. 122.6–124.6° C.

*Analysis.*—Calcd. for $C_{30}H_{31}NO_2$ (percent): C, 82.34; H, 7.14; N, 3.20. Found (percent): C, 81.89; H, 6.80; N, 3.20.

Step (d): Preparation of threo α-(1-aminoethyl)-3-hydroxybenzyl acetate.—A mixture of 1.0 g. of a 5% palladium-on-carbon catalyst and 2.15 g. of (4.92 mmoles) of threo 3-benzyloxy-α-(1-dibenzylaminoethyl)-benzyl alcohol in 50 ml. of absolute ethanol containing 1.0 ml. of an 8 N ethanolic-hydrogen chloride solution is hydrogenated at 25° C. and atmospheric pressure. After 15 minutes, two equivalents of hydrogen are absorbed. The palladium catalyst is removed by filtration and replaced by 1.0 g. of a 5% palladium-on-alumina catalyst. One more equivalent of hydrogen is taken up smoothly at 52° C. and atmospheric pressure. The catalyst is removed by filtration and the ethanol solvent evaporated under reduced pressure. The residue is dissolved in water, neutralized with sodium bicarbonate, saturated with sodium chloride and extracted several times with ethyl acetate. The ethyl acetate extracts are combined, dried over anhydrous sodium sulfate, filtered and concentrated to 0.1 g. of an oil. An additional 0.33 g. of crude product is obtained by evaporating the aqueous extract to dryness under reduced pressure and extracting the residue with hot ethyl acetate. Treatment of the crude product with an equivalent amount of fumaric acid in ethanol and ethyl acetate gives the fumarate salt of threo 3-hydroxy-α-(1-aminoethyl)-benzyl alcohol, M.P. 212.4–214.4° C. dec. Further recrystallization from a methanol-ethyl acetate solvent mixture gives an analytical sample, M.P. 215.4–216.4° C. dec.

*Analysis.*—Calcd. for $C_{22}H_{30}N_2O_8$ (percent): C, 58.65; H, 6.71; N, 6.22. Found (percent): C, 58.29; H, 6.66; N, 6.64.

This threo compound is reacted with acetic anhydride according to the process of Example 1, step (a) to form the α-(1-acetamidoethyl) derivative, which is converted by acid-catalyzed rearrangement as in Example 1, step (b) to give threo α-(1-aminoethyl)-3-hydroxybenzyl acetate.

EXAMPLE 6

Preparation of (−) erythro α-(1-aminoethyl)-3-methoxybenzyl acetate (1R,2S).—A stirred mixture of 15 g. (0.0719 mole) of (−) erythro α-(1-acetamidoethyl)-3-hydroxybenzyl alcohol prepared as in Example 1, step (a), 30 g. of anhydrous potassium carbonate, 13.2 g. of dimethylsulfate and 500 ml. of acetone is heated at reflux for 8 hours. Inorganic salts are removed by filtration. The acetone solution is concentrated under vacuum to an oily residue which is then heated at reflux for 24 hours and 50 ml. of a 10% sodium hydroxide solution and 150 ml. of ethanol. The reaction mixture is concentrated under vacuum to remove most of the ethanol and water is added to bring the total volume to about 100 ml. After saturating with sodium chloride, the crude product is extracted into three 100 ml. portions of ethyl acetate. The ethyl acetate extracts are combined, dried over anhydrous sodium sulfate, filtered and concentrated. The residue, 13 g., is dissolved in ethanol, treated with 15 g. of maleic acid and the hydrogen maleate salt precipitated with ethyl ether to give 10.4 g. (48.8%) of the methoxy derivative, M.P. 153.4–155.9° C./dec. Recrystallization from an ethanol-ethyl ether mixture gives an analytical sample, M.P. 153.4–154.4° C. dec., $[\alpha]_D^{25}=-24°$ (c.=2, $H_2O$).

*Analysis.*—Calcd. for $C_{14}H_{19}NO_6$ (percent): C, 56.56; H, 6.44; N, 4.70. Found (percent): C, 56.62; H, 6.15; N, 5.01.

This α-(1-acetamidoethyl) compound is converted by the acid-catalyzed rearrangement of Example 1, step (b) to give (−) erythro-α-(1-aminoethyl)-3-methoxybenzyl acetate (1R,2S). By starting with racemic erythro α-(1-aminoethyl)-3-hydroxybenzyl alcohol hydrogen tartrate, the racemic erythro 3-methoxy acetyl ester is obtained. Similarly, racemic erythro α-(1-aminoethyl)-3-methoxybenzyl benzoate is produced from racemic erythro α-(1-benzamidoethyl)-3-hydroxybenzyl alcohol by following Example 6 and the acid catalyzed rearrangement of step (b), Example 2. The racemic erythro α-(1-benzamidoethyl)-3-hydroxybenzyl alcohol is prepared from the racemic erythro α-(1-aminoethyl)-3-hydroxybenzyl alcohol according to step (a), Example 2.

EXAMPLE 7

Preparation of erythro α-(1-aminoethyl)-3-methoxy-6-methylbenzyl propional

Step (a): Preparation of 3-methoxy-6-methylpropiophenone.—A solution of 3.8 g. (0.69 mole) of propionitrile in 25 ml. of anhydrous ethyl ether is added dropwise to a stirred solution of the Grignard reagent prepared from 13.8 g. (0.069 mole) of 2-bromo-4-methoxy toluene and 1.7 g. (0.069 g.-atoms) of magnesium turnings in 100 ml. of anhydrous ethyl ether. After addition is complete, the reaction is heated an additional 15 hours at reflux. The reaction mixture is then cooled to 0° C. and treated with 50 ml. of cold concentrated hydrochloric acid. The aqueous acid layer is separated and heated at reflux for 90 minutes and then cooled to room temperature and extracted with 250 ml. of ethyl ether. The ether extract is dried over anhydrous sodium sulfate, filtered and concentrated to a dark oil. Distillation through a short Vigreux column gives 3.5 g. (28.5%) of 3-methoxy-6-methylpropiophenone, B.P. 146.0–147.0° C. at 18 mm. mercury pressure. A center fraction was redistilled for analysis.

*Analysis.*—Calcd. for $C_{11}H_{14}O_2$ (percent): C, 74.12; H, 7.91. Found (percent): C, 73.75; H, 7.80.

Step (b): Preparation of 3-methoxy - 6 - methyl-α-hydroxy-iminopropiophenone.—A solution of 2.1 g. (0.018 mole) of freshly distilled isoamyl nitrite in 50 ml. of anhydrous ethyl ether is added dropwise to a solution of 3.0 g. (0.017 mole) of 3-methoxy-6-methyl-propiophenone in 50 ml. of anhydrous ethyl ether at room temperature. Dry hydrogen chloride gas is bubbled continuously through the reaction mixture during the addition and for an additional ½ hour after addition is complete. The reaction mixture is then stirred at room temperature for 3 hours. The excess hydrogen chloride and ether solvent are removed under vacuum and the resulting solid is washed with hexane and dried at 65° C. to yield 2.6 g. (75%) of the desired oxime, M.P. 135.0–138.0° C. An analytical sample with the same melting point was obtained by recrystallization from a methanol-hexane mixture.

*Analysis.*—Calcd. for $C_{11}H_{13}NO_3$ (percent): C, 63.75; H, 6.32; N, 6.75. Found (percent): C, 63.82; H, 5.98; N, 6.90.

Step (c): Preparation of 3-methoxy-6-methyl-α-aminopropiophenone hydrochloride.—A mixture of 3.0 g. (0.028 mole) of 3-methoxy-6-methyl-α-hydroxyiminopropiophenone in 100 ml. of a 2 N ethanolic-hydrogen chloride solution and 0.5 g. of a 5% palladium on carbon catalyst is hydrogenated at 25° C. and atmospheric pressure until 2 equivalents of hydrogen are taken up. The catalyst is then removed by filtration and the solvent evaporated under vacuum. The residue is recrystallized from a methanol-ethyl acetate mixture to give 3.0 g. (46%) of 3-methoxy - 6 - methyl-α-aminopropiophenone hydrochloride, M.P. 179.7–182.7° C. dec.

*Analysis.*—Calcd. for $C_{11}H_{16}ClNO_2$ (percent): C, 57.51; H, 7.02; N, 6.09. Found (percent): C, 57.56; H, 6.96; N, 6.26.

Step (d): Preparation of erythro α-(1-aminoethyl) 3-methoxy-6-methylbenzyl propionate.—A mixture of 1.5 g. (0.0044 mole) of 3-methoxy-6-methyl-α-aminopropiophenone hydrochloride and 0.5 g. of a 10% palladium on carbon catalyst in 30 ml. of water is hydrogenated at atmospheric pressure and 25° C. until one equivalent of hydrogen has been absorbed. The reaction mixture is filtered and concentrated under vacuum to give a white solid, which after two recrystallizations from an ethanol-ethyl ether mixture affords 1.3 g. (87%) of the erythro α-(1-aminoethyl)-3-methoxy-6 - methylbenzyl alcohol hydrochloride, M.P. 249–250° C. dec.

*Analysis.*—Calcd. for $C_{11}H_{18}ClNO_2$ (percent): C, 57.01; H, 7.83; N, 6.05. Found (percent): C, 57.37; H, 7.52; N, 6.05.

This compound is converted to the desired erythro α-(1-aminoethyl) - 3 - methoxy-6-methylbenzyl propionate according to the procedure of Example 1, substituting propionic anhydride for acetic anhydride in step (a).

EXAMPLE 8

Preparation of (+) erythro α-(1 - aminoethyl) - 3 - (m-chlorobenzyloxy)-benzyl benzoate (1R,2S)

Step (a): Preparation of erythro α-(1-aminoethyl)-3-(m-chlorobenzyloxy)-benzyl alcohol.—A stirred mixture of 8.8 g. (0.043 mole) of erythro α-(1-acetamidoethyl)-3-hydroxybenzyl alcohol (prepared from racemic erythro α-(1-aminoethyl) - 3 - hydroxybenzyl alcohol by the procedure in step (a), Example 1), 30.0 g. of anhydrous potassium carbonate, 10.0 g. (0.0487 mole) of m-chlorobenzyl bromide and 500 ml. of Merck reagent grade acetone is heated at reflux for 20 hr. The warm reaction mixture is filtered and the filtrate concentrated under vacuum at water aspirator pressure (40–70° C.) to an orange oil. The oil is dissolved in a mixture of 100 ml. of water and 100 ml. of ethyl acetate, treated with a 10% sodium hydroxide solution to pH 9 and the organic layer separated. After extracting the aqueous layer with 3 more 150 ml. portions of ethyl acetate, the ethyl acetate extracts are combined and washed with two 100-ml. portions of water. The organic extracts are dried over anhydrous sodium sulfate, filtered and concentrated under vacuum at water aspirator pressure (40–70° C.) to an orange oil. The residue is dissolved in a mixture of 50 ml. of a 10% sodium hydroxide solution and 150 ml. of ethanol and stirred at reflux for 18 hr. The reaction mixture is concentrated under vacuum at water aspirator pressure (40–70° C.) to remove most of the ethanol. One hundred ml. of water is added to the residue which is then saturated with sodium chloride and extracted with three 75-ml. portions of ethyl acetate. The ethyl acetate extracts are combined, dried over anhydrous sodium sulfate, filtered and concentrated under water aspirator vacuum at 40–70° C. to give the m-chlorobenzyl ether as a yellow oil.

Step (b): Preparation of (+) erythro α-(1-aminoethyl)-3-(m-chlorobenzyloxy)-benzyl benzoate (1R,2S).—A quantity of 2 g. (6.85 mmoles) of the racemic aminoalcohol of step (a) in 20 ml. of methanol is added to a solution of 2.7 g. (7.0 mmoles) of (+) di-p-toluyl-1-tartaric acid in methanol. Addition of ethyl acetate and careful cooling give a solid which is recrystallized from isopropanol or methanol-ethyl acetate to constant melting point and optical rotation. The mother liquors containing the other diasteroisomer are concentrated to yield a solid which is similarly recrystallized.

The purified tartrate salt of the levorotatory aminoalcohol is suspended in water and shaken with a dilute sodium hydroxide solution and ethyl ether until solution is complete. The ether layer is washed with water, dried over sodium sulate, filtered and concentrated. The residue is treated with ethanolic methanesulfonic acid as previously described to form the mesylate salt. Recrystallization from ethanol-ether gives the pure pmesylate salt of (−) erythro α-(1-aminoethyl)-3-(m-chlorobenzyloxy)-benzyl alcohol, melting with decomposition at 117–120° C., $[\alpha]_D^{25} = -15.2°$ water (c., 1.0). This optical isomer is converted to the desired (+) erythro α-(1-aminoethyl)-3-(m-chlorobenzyloxy)-benzyl benzoate according to the process of Example 4, substituting benzoyl chloride for the 2-methylbenzoyl chloride of step (b). By employing the racemic erythro product of step (c) of this example, racemic erythro benzoate is obtained. Treatment of the racemic erythro product of step (c) of this example according to the process of Example 1 produces erythro α-(1-aminoethyl)-3-(m-chlorobenzyloxy)-benzyl acetate.

In a similar manner, (+) erythro α-(1-ethylaminoethyl)-3-hydroxybenzyl benzoate is prepared according to the process of Example 4 from benzoyl chloride and (−) erythro α-(1-ethylaminoethyl)-3-hydroxybenzyl alcohol which is, in turn, prepared by reducing the α-(1-acetamidoethyl) compound of Example 1, step (a) with lithium aluminum hydride in ethyl ether.

Other specific compounds of the invention are produced by the techniques hereinbefore described, suitably modified, as will be apparent to those skilled in the art.

What is claimed is:

1. A method of treating hypertension or inhibiting gastric secretion which comprises administering to patients in combination with pharmaceutical carriers an effective amount of a compound selected from the group consisting of (1) a compound of the formula

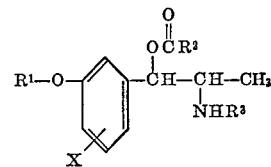

wherein $R^1$ is hydrogen,

or $R^4$—$CH_2$— wherein R is lower alkyl or phenyl; $R^4$ is hydrogen, lower alkyl, phenyl or halogen substituted phenyl; X is hydrogen or lower alkyl; $R^3$ is hydrogen or lower alkyl; $R^2$ is lower alkyl, phenyl or lower alkyl substituted phenyl; and (2) non-toxic addition salts of the compounds of group (1).

2. The method of treating hypertension in patients according to claim 1 wherein 5 to 500 mg. of the compound is administered daily.

3. A method of treating hypertension or inhibiting gastric secretion which comprises administering to patients in combination with pharmaceutical carriers an effective amount of the compound (−) erythro α-(1-aminoethyl)-3-hydroxybenzyl acetate (1R,2S).

4. A pharmaceutical composition for treating hypertension or inhibiting gastric secretion comprising an inert pharmaceutical carrier and an effective amount of a compound selected from the group consisting of (1) of the formula

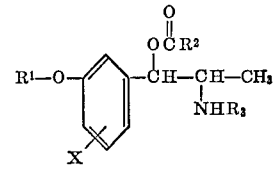

wherein $R^1$ is hydrogen,

or $R^4$—$CH_2$— wherein R is lower alkyl or phenyl; $R^4$ is hydrogen, lower alkyl, phenyl or halogen substituted phenyl; X is hydrogen or lower alkyl; $R^3$ is hydrogen or lower alkyl; $R^2$ is lower alkyl, phenyl or lower alkyl substituted phenyl; and (2) non-toxic addition salts of the compounds of group (1).

5. The pharmaceutical composition of claim 4 wherein the compound is present in amounts of from 5 to 500 mg.

6. A pharmaceutical composition for treating hypertension or inhibiting gastric secretion comprising an inert pharmaceutical carrier and an effective amount of the compound (—) erytho α-(1-aminoethyl)-3-hydroxybenzyl acetate (1R,2S).

References Cited
UNITED STATES PATENTS
3,457,354   7/1969   Stone _____ 427—330

SAM ROSEN, Primary Examiner

U.S. Cl. X.R.
424—308